United States Patent [19]

Sasaki

[11] Patent Number: 5,479,348
[45] Date of Patent: Dec. 26, 1995

[54] DIFFERENTIAL LIMITING TORQUE CONTROL SYSTEM FOR AUTOMOTIVE VEHICLES

[75] Inventor: Hiroki Sasaki, Yokohama, Japan

[73] Assignee: Nissan Motor Co., Ltd., Yokohama, Japan

[21] Appl. No.: 268,527

[22] Filed: Jul. 6, 1994

[30] Foreign Application Priority Data

Aug. 5, 1993 [JP] Japan .................................. 5-194462

[51] Int. Cl.$^6$ ................................................ B60K 23/04
[52] U.S. Cl. ................................. 364/426.03; 180/197
[58] Field of Search ............................ 364/426.01, 426.03, 364/424.1; 180/197, 248; 361/238

[56] References Cited

U.S. PATENT DOCUMENTS

| | | | |
|---|---|---|---|
| 5,152,362 | 10/1992 | Naito ........................................ | 180/248 |
| 5,168,953 | 12/1992 | Naito ........................................ | 180/197 |
| 5,172,787 | 12/1992 | Kobayashi ................................ | 180/197 |
| 5,213,177 | 5/1993 | May .......................................... | 180/197 |
| 5,287,941 | 2/1994 | Masuda et al. .......................... | 180/197 |
| 5,332,059 | 7/1994 | Shirakawa et al. ...................... | 180/197 |

FOREIGN PATENT DOCUMENTS 61-102321  5/1986  Japan .

*Primary Examiner*—Michael Zanelli
*Attorney, Agent, or Firm*—Foley & Lardner

[57] ABSTRACT

An automobile differential limiting torque control system with a limited slip differential mounted between right and left drive road wheels for limiting a differential action, comprises sensors for detecting a vehicle speed and an accelerating degree of the vehicle, and an active limited slip differential controller responsive to the accelerating degree for deriving a target torque value for the differential limiting torque. The controller derives the slip difference between a vehicle-speed dependent allowable slip limit and an actual slip amount at an outer wheel of the right and left drive road wheels during cornering of the vehicle in the presence of depression of the accelerator pedal. The controller includes a filter responsive to the slip difference, for filtering the derived target torque value so that the actual slip amount is maintained within the allowable slip limit through a filtering process which sets a limit to a decrement of a previous control command when the actual slip amount exceeds the allowable slip limit, and sets a limit to an increment of the previous control command when the actual slip amount is less than and close to the allowable slip limit. The controller adjusts the differential limiting torque to the filtered target torque value.

11 Claims, 5 Drawing Sheets

FIG.8

Ti(n-1);PREVIOUS Ti
TAD=(TA+TYG);NEWLY DERIVED TARGET TORQUE

| | Ti(n-1)<TAD | Ti(n-1)=TAD | Ti(n-1)>TAD |
|---|---|---|---|
| ΔVS>5Km/h | TAY=(TA+TYG) (UPDATE) | TAY=(TA+TYG) (UPDATE) | TAY=(TA+TYG) (UPDATE) |
| 3<ΔVS≦5Km/h | AFTER HOLDING CONST. FOR 10msec TAY=min(TA+TYG, Ti(n-1)+0.05) | TAY=Ti(n-1) (HOLD) | TAY=(TA+TYG) (UPDATE) |
| 0≦ΔVS≦3Km/h | TAY=Ti(n-1) (HOLD) | TAY=Ti(n-1) (HOLD) | TAY=(TA+TYG) (UPDATE) |
| -3≦ΔVS<0Km/h | AFTER HOLDING CONST. FOR 10msec TAY=Ti(n-1)-0.05 | AFTER HOLDING CONST. FOR 10msec TAY=Ti(n-1)-0.05 | AFTER HOLDING CONST. FOR 10msec TAY=min(TA+TYG, Ti(n-1)-0.05) |
| ΔVS<-3Km/h | TAY=Ti(n-1)-0.5 | TAY=Ti(n-1)-0.5 | TAY=min(TA+TYG, Ti(n-1)-0.5) |

OUTER-WHEEL SLIP ≦ ALLOWABLE LIMIT (rows 1–3)

OUTER-WHEEL SLIP > ALLOWABLE LIMIT (rows 4–5)

DIFFERENTIAL LIMITING TORQUE CONTROL SYSTEM FOR AUTOMOTIVE VEHICLES

BACKGROUND OF THE INVENTION

1. Field of the Invention

The present invention relates to a differential limiting torque control system for a limited slip differential employed between right and left drive road wheels of an automotive vehicle, in which a differential limiting torque of the limited slip differential is electronically controlled by adjusting an engaging force of a clutch device operably arranged between a differential case and differential side gears, based on an acceleration-state indicative information such as a depression of an accelerator pedal or a throttle opening called an accel opening, and a longitudinal acceleration exerted on the vehicle body.

2. Description of the Prior Art

Recently, there have been proposed and developed various differential limiting torque control systems for automotive vehicles, in which a differential limiting torque is variably controlled depending on input information representative of an acceleration state of the vehicle. One such conventional automobile differential limiting system has been disclosed in Japanese Patent Provisional Publication No. 61-102321. For instance, the above-noted conventional system electronically adjusts the differential limiting torque so that the differential limiting torque is increased in accordance with an increase in accelerating degree of the vehicle such as a depression amount of the accelerator pedal. The acceleration state indicative information is correlated to an acceleration component acting in a longitudinal direction of the vehicle. In particular, in the event that the accelerator pedal is excessively depressed when the vehicle turns to the right or to the left on low-frictional roads, there is a possibility that the vehicle will experience an undesired rapid change in its behaviour, so-called power oversteer. As is well known, during cornering, more of the car weight is transferred to the outer wheels and thus the car weight becomes less at the inner wheels owing to such load shift. As a result, the lower-loaded inner wheel tends to slip. In this conventional differential limiting torque control system, in case that the differential limiting torque is rapidly increased due to excessive depression of the accelerator pedal when the vehicle is operating in a cornering critical region, an engine power, i.e., a road-wheel driving torque is transferred from the lower-loaded inner drive-wheel to the higher-loaded outer drive-wheel. This results in a rapid drop in cornering force acting between the outer drive-wheel and the road surface. Consequently, power oversteer tends to occur owing to excessive acceleration in the cornering critical region.

SUMMARY OF THE INVENTION

Accordingly, it is an object of the present invention to provide an improved differential limiting torque control system for automotive vehicles which avoids the foregoing disadvantages of the prior art.

It is another object of the invention to provide a differential limiting torque control system for an automotive vehicle with an electronically controlled limited slip differential, in which a differential limiting torque is optimally controlled depending on an acceleration-state indicative information so that the system prevents the behaviour of the vehicle from rapidly changing towards a cornering critical region owing to accelerating operation, while ensuring a high acceleration performance in response to the accelerating operation during cornering.

In order to accomplish the aforementioned and other objects of the invention, a differential limiting torque control system for an automotive vehicle having at least one pair of right and left drive road wheels, comprises differential limiting means mounted between the right and left drive road wheels, and responsive to a control command for producing a controlled differential limiting torque through which a differential action is limited, sensor means for detecting a vehicle speed and an accelerating degree of the vehicle, target torque derivation means responsive to the accelerating degree, for deriving an acceleration-responsive target torque value for the differential limiting torque, allowable slip limit derivation means for deriving an allowable slip limit of an outer wheel of the right and left drive road wheels on the basis of the vehicle speed during cornering of the vehicle, actual slip amount derivation means for deriving an actual slip amount at the outer wheel, filtering means responsive to a slip difference between the actual slip amount and the allowable slip limit, for filtering the acceleration-responsive target torque value, so that the actual slip amount is maintained within the allowable slip limit by setting a limit to a decrement of a previous value of the control command through a filtering process in case that the actual slip amount exceeds the allowable slip limit, and control means for generating the control command to the differential limiting means to adjust the differential limiting torque to the filtered target torque value.

According to another aspect of the invention, a differential limiting torque control system for an automotive vehicle having at least one pair of right and left drive road wheels, comprises differential limiting means mounted between the right and left drive road wheels, and responsive to a control command for producing a differential limiting torque through which a differential action is limited, sensor means for detecting a vehicle speed and an accelerating degree of the vehicle, target torque derivation means responsive to the accelerating degree, for deriving an acceleration-responsive target torque value for the differential limiting torque, allowable slip limit derivation means for deriving an allowable slip limit of an outer wheel of the right and left drive road wheels on the basis of the vehicle speed during cornering of the vehicle, actual slip amount derivation means for deriving an actual slip amount at the outer wheel, filtering means responsive to a slip difference between the actual slip amount and the allowable slip limit, for filtering the acceleration-responsive target torque value, so that the actual slip amount is maintained within the allowable slip limit by setting a limit to an increment of a previous value of the control command through a filtering process in case that the actual slip amount is less than the allowable slip limit when the derived acceleration-responsive target torque value exceeds the previous value of the control command, and control means for generating the control command to the differential limiting means to adjust the differential limiting torque to the filtered target torque value.

According to a further aspect of the invention, a differential limiting torque control system for an automotive vehicle having at least one pair of right and left drive road wheels, comprises differential limiting means mounted between the right and left drive road wheels, and responsive to a control command for producing a controlled differential limiting torque through which a differential action is limited, sensor means for detecting a vehicle speed, an accelerating degree of the vehicle, and a lateral acceleration exerted on the vehicle, target torque derivation means responsive to the accelerating degree and the lateral acceleration, for deriving an acceleration-responsive target torque value for the differential limiting torque, target slip speed derivation means for deriving a target slip speed at an outer wheel of the right and left drive road wheels on the basis of the vehicle speed and the lateral acceleration during cornering of the vehicle, actual slip speed derivation means for deriving an actual slip speed at the outer wheel, comparing means for comparing a previous value of the control command with the derived acceleration-responsive target torque value to obtain a comparison result filtering means responsive to a slip speed difference between the actual slip speed and the target slip speed and the comparison result for filtering the acceleration-responsive target torque value so that the actual slip speed is maintained within the target slip speed; a filtering process of the filtering means being executed by setting a limit to a decrement of a previous value of the control command in case that the actual slip speed exceeds the target slip speed, and by setting a limit to an increment of the previous value of the control command in case that the actual slip speed is less than the target slip speed and within a predetermined slip speed region close to the target slip speed, when the derived acceleration-responsive target torque value exceeds the previous value of the control command, and control means for generating the control command to the differential limiting means to adjust the differential limiting torque to the filtered target torque value. It is preferable that the decrement is varied depending on the slip speed difference so that a magnitude of the decrement is increasingly compensated as the actual slip speed is increased greater than the target slip speed. To ensure a moderate change in the differential limiting torque, the previous value of the control command is updated with the increment just after a predetermined delay time has elapsed, only in the predetermined slip speed region close to the target slip speed. The filtering process may include a select-low process which selects a lower one of the derived acceleration-responsive target torque value and the sum of the previous value of the control command and the increment.

BRIEF DESCRIPTION OF THE DRAWINGS

FIG. 8 is a control table for a filtering process in accordance with which an acceleration-responsive controlled differential limiting torque TAY is derived from an acceleration-responsive target torque TAD.

DESCRIPTION OF THE PREFERRED EMBODIMENTS

Figure 1:
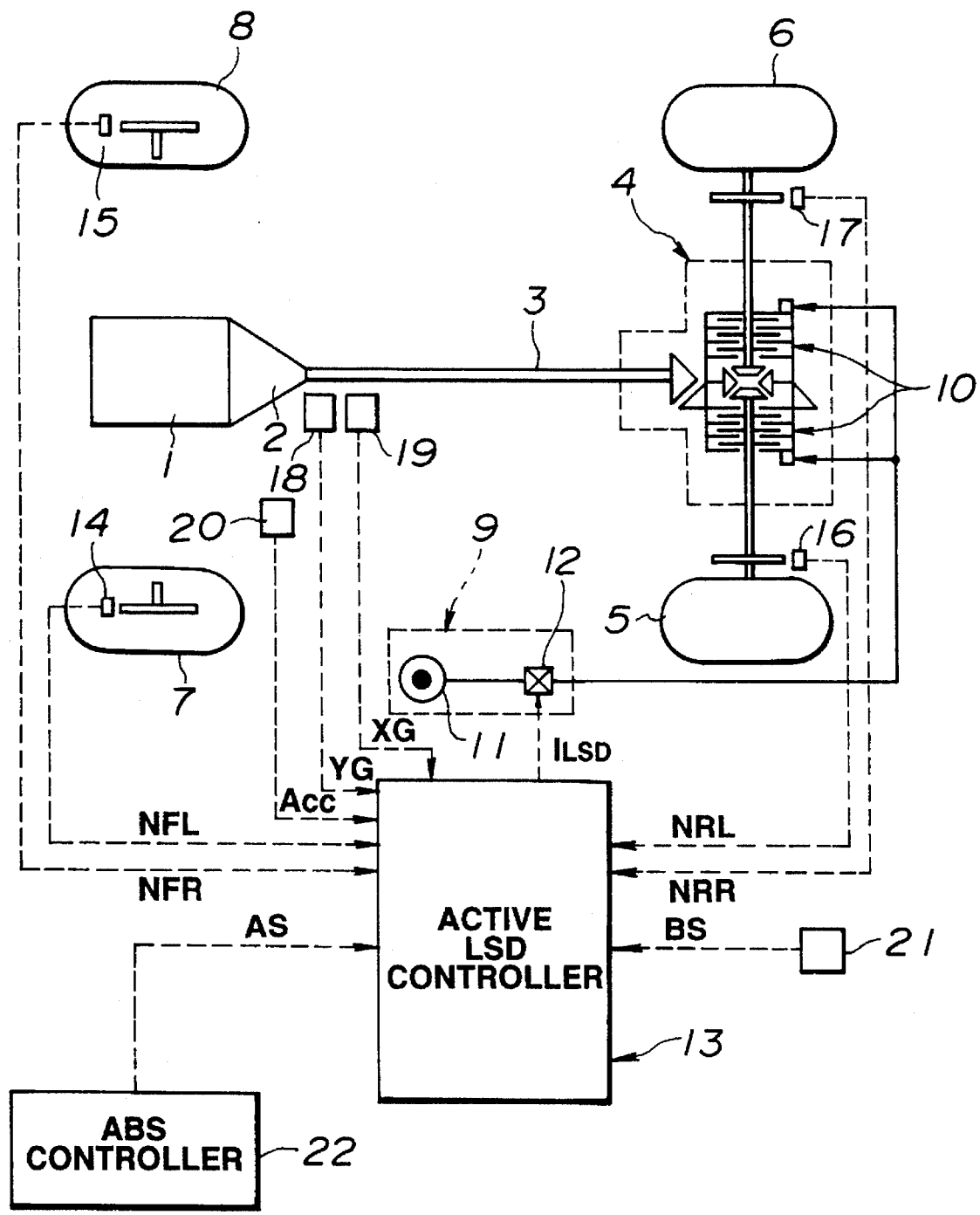
FIG. 1 is a schematic system diagram of a rear-wheel drive vehicle with a differential limiting torque control system according to the invention.

Referring now to the drawings, particularly to FIG. 1, the differential limiting torque control system of the invention is exemplified in case of a rear-wheel drive vehicle. As seen in FIG. 1, reference numerals 1, 2, 3 and 4 designate an internal combustion engine, a transmission, a propeller shaft and an electronically controlled limited slip differential hereinbelow abbreviated as a "LSD", respectively. Reference numerals 5 and 6 denote rear-left and rear-right drive road wheels, while reference numerals 7 and 8 denote front-left and front-right road wheels. The LSD 4 includes a hydraulically-operated multiple-disc type differential limiting clutch 10 which produces a differential limiting torque between the two rear drive wheels 7 and 8 in response to a clutch control pressure produced by a hydraulic unit 9. The hydraulic unit 9 includes a hydraulic pressure source 11 and a LSD control valve 12. The hydraulic unit 9 and the differential limiting clutch 10 are cooperative to each other to provide a controlled differential limiting torque. The LSD control valve 12 is responsive to a value of a control current ILSD generated from an active LSD controller 13 constituting a most important component of the differential limiting torque control system according to the invention, to produce a required clutch control pressure for the differential limiting clutch 10. The active LSD controller 13 receives input information from various sensors, namely a front-left wheel revolution speed NFL detected by a front-left wheel speed sensor 14, a front-right wheel revolution speed NFR detected by a right-front wheel speed sensor 15, a rear-left wheel revolution speed NRL detected by a rear-left wheel speed sensor 16, a rear-right wheel revolution speed NRR detected by a rear-right wheel speed sensor 17, a lateral acceleration YG detected by a lateral acceleration sensor 18, a longitudinal acceleration XG detected by a longitudinal acceleration sensor 19, an accel-opening Acc detected by an acceleration opening sensor 20, a switch signal BS produced by a brake switch 21, and an ABS operative state indicative flag AS produced by an ABS controller 22 executing an anti-skid brake control according to which maximum effective braking is provided. For the sake of illustrative simplicity, although it is not clearly shown in FIG. 1, the active LSD controller 13 includes a select-HIGH comparator which performs a decision procedure in step 42 of the flow diagram shown in FIG. 2, a filter which performs a filtering process in step 41 of the control flow shown in FIG. 2, and a select-LOW comparator which is employed in the filter to compare two torque values, namely an acceleration-responsive target torque TAD and a controlled torque value properly limited through the filtering process, as hereinbelow described in detail. The operation of the active LSD controller 13 is explained in accordance with the control flow illustrated in FIG. 2.

Figure 2:
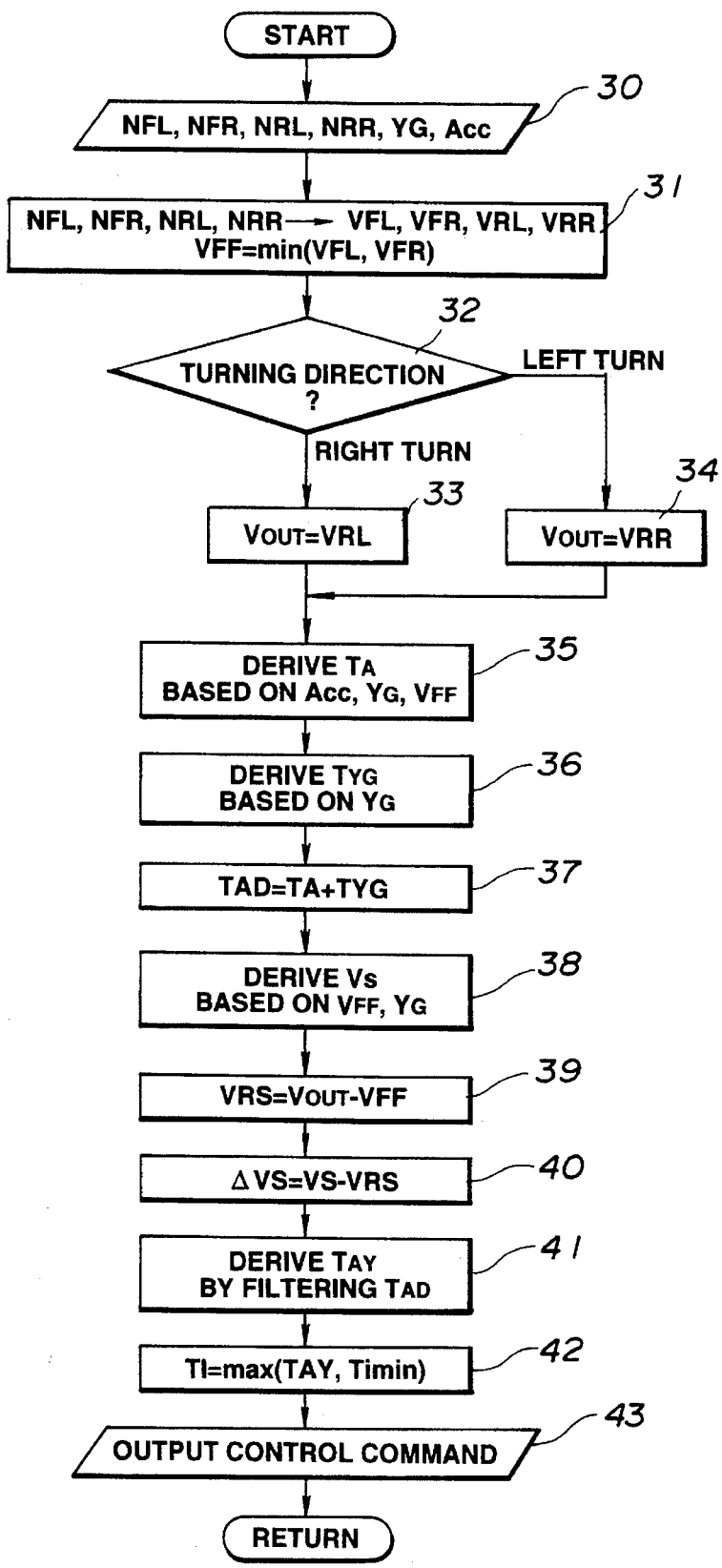
FIG. 2 is a flow chart illustrating a control procedure of the differential limiting torque control executed by the differential limiting torque control system shown in FIG. 1.

Referring now to FIG. 2, the control routine is executed as time-triggered interrupt routines to be triggered every predetermined time intervals, such as 10 msec.

In step 30, the LSD controller 13 reads out the four detected wheel revolution speeds NFL, NFR, NRL, NRR, and the detected lateral acceleration YG, and the detected accel-opening Acc.

In step 31, the wheel revolution speeds NFL, NFR, NRL, NRR are replaced respectively as front-left, front-right, rear-left and rear-right wheel speeds VFL, VFR, VRL and VRR. In addition, the controller 13 selects the lower one of the two front wheel speeds VFL and VFR as a vehicle speed VFF, by way of a select-LOW process.

In step 32, a test is made to determine on the basis of the sign (the direction) of the detected lateral acceleration YG whether the vehicle turns to the right or to the left. In case of the right turn, step 33 proceeds in which the rear-left drive wheel speed VRL is determined as a cornering outer wheel speed VOUT. In contrast, in case of the left turn, step 34 proceeds in which the rear-right drive wheel speed VRR is determined as the cornering outer wheel speed VOUT.

Figure 3:
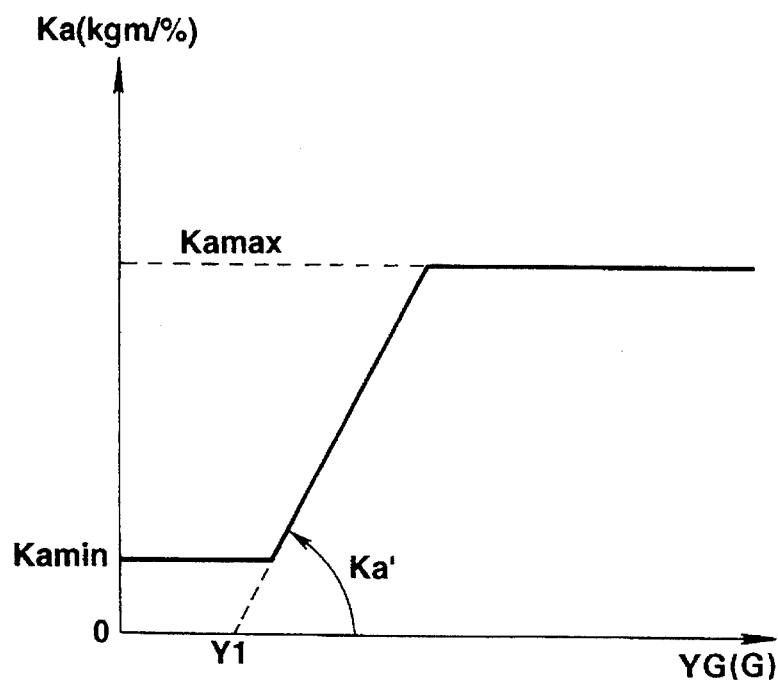
FIG. 3 is a graph illustrating a control gain Ka versus lateral acceleration YG characteristic.

In step 35, the controller 13 calculates and derives an accel-opening responsive torque TA on the basis of the accel-opening Acc, the lateral acceleration YG, and the vehicle speed VFF. In more detail, the accel-opening responsive torque TA is determined on the basis of the accel-opening Acc, a specified offset value A0 of the accel-opening, a specified maximum value TAmax of the accel-opening responsive torque TA, and a control gain Ka, in accordance with the characteristics illustrated in FIGS. 3 and 4. As seen in FIG. 3, the control gain Ka for the accel-opening responsive torque TA is determined on the basis of a specified offset value Y1 of the lateral acceleration YG, upper and lower limits Kamax and Kamin of the control gain Ka, and a vehicle-speed dependent control gain Ka' for the control gain Ka. The vehicle-speed dependent control gain Ka' and the vehicle-speed dependent upper limit Kamax of the control gain Ka are derived through a specified vehicle-speed versus control gain Ka' characteristic (not shown) according to which the higher the vehicle speed, the lower the control gain Ka', and through a specified vehicle-speed versus upper limit Kamax characteristic (not shown) according to which the higher the vehicle speed, the lower the limit Kamax, in a conventional manner. That is, the two factors Ka' and Kamax are not tuning constants, but vehicle-speed dependent variables. Such a vehicle-speed dependent gain/upper limit control has been disclosed in U.S. Pat. No. 5,168,953 to Genpei Naito, assigned to the assignee to this invention, and hereby incorporated into the specification by reference. On the other hand, the two offset values Y1 and A0, the lower limit Kamin of the control gain Ka and the maximum value TAmax of the accel-opening responsive torque TA are tuning constants which are optimally selected depending on various types of automotive vehicles and on a specified control objective.

Figure 5:
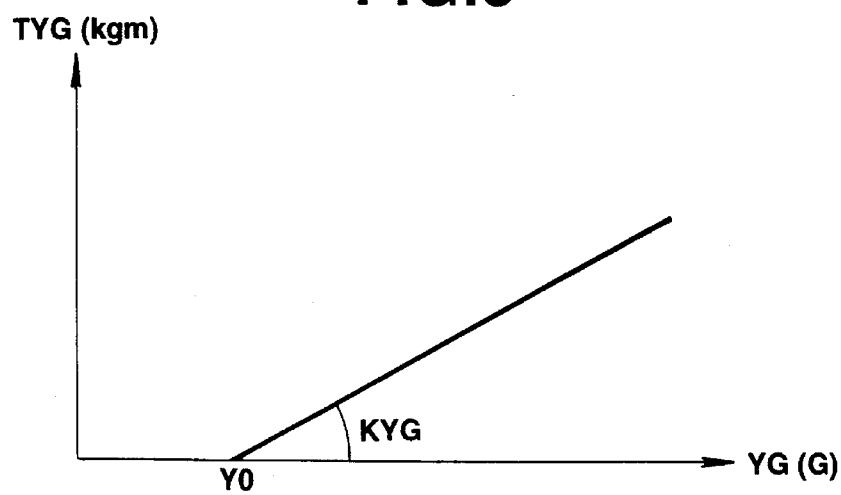
FIG. 5 is a graph illustrating a lateral-acceleration responsive torque characteristic.

In step 36, a lateral-acceleration responsive torque TYG is calculated and derived on the basis of the detected lateral acceleration YG in accordance with the characteristic shown in FIG. 5. The characteristic of FIG. 5 is defined by a specified offset value Y0 of the lateral acceleration and a proportional gain KYG for the lateral acceleration responsive torque TYG. These factors Y0 and KYG are also tuning constants. As seen in FIG. 5, the lateral-acceleration responsive torque TYG increases in direct proportion to the lateral acceleration YG in case of the lateral acceleration above the offset value Y0.

In step 37, an acceleration-responsive target torque TAD is calculated and temporarily derived as the sum (TA+TYG) of the accel-opening responsive torque TA and the lateral-acceleration responsive torque TYG.

In step 38, an outer-wheel target slip speed VS is derived as the product (VSA×KSG) of a vehicle-speed dependent reference target slip speed VSA and a lateral-acceleration dependent proportional gain KSG. The vehicle-speed dependent reference target slip speed VSA and the lateral-acceleration dependent proportional gain KSG are respectively derived from the characteristics shown in FIGS. 6 and 7. As appreciated, the derived outer-wheel target slip speed VS is generally correlative to a permissible slippage or slip amount at the cornering outer wheel.

In step 39, an actual outer-wheel slip speed VRS is determined as the difference (VOUT−VFF) between the cornering outer wheel speed VOUT and the vehicle speed VFF.

In step 40, a slip speed difference ΔVS is determined as the difference (VS−VRS) between the outer-wheel target slip speed VS and the actual outer-wheel slip speed VRS.

In step 41, an acceleration-responsive controlled torque TAY is derived by filtering the derived acceleration-responsive target torque TAD through a predetermined filtering process based on the control table shown in FIG. 8. The filtering process is detailed later.

In step 42, the select-HIGH comparator employed in controller 13 selects the higher one of the acceleration-responsive controlled differential limiting torque TAY and a preset initial torque Timin through a select-HIGH process and sets the selected higher one as an initial controlled torque TI.

In step 43, the active LSD controller 13 outputs a control command, i.e., the control current ILSD to the LSD control valve 12 in response to the initial controlled torque value, thereby producing the initial controlled torque TI.

Figure 4:
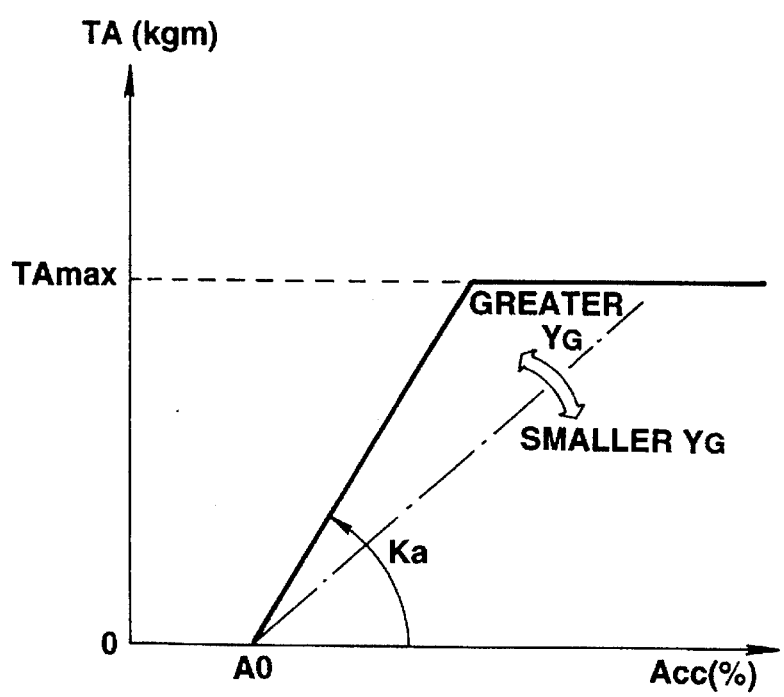
FIG. 4 is a graph illustrating an accel-opening responsive torque characteristic.

In setting the accel-opening responsive torque TA, the torque TA is set to zero until the accel-opening Acc has reached to the predetermined offset value A0 of the accel-opening, as seen in FIG. 4. When exceeding the offset value A0, the torque TA is designed to increase at a positive gradient defined by the control gain Ka in direct proportion to an increase in the accel-opening Vcc. The upper limit of the torque TA is limited by the predetermined maximum value TAmax of the accel-opening responsive torque. On the other hand, as shown in FIG. 4, the control gain Ka for the accel-opening responsive torque TA is set to the lower limit Kamin in a low lateral-acceleration region, and to the upper limit Kamax in a high lateral-acceleration region. Within the middle region midway between the low and high lateral-acceleration regions, the control gain Ka is set to increase at a positive gradient defined by the vehicle-speed dependent control gain Ka' in proportion to an increase in the lateral acceleration YG. The aim in providing the accel-opening responsive torque TA as one of essential factors of the controlled differential limiting torque is hereinafter described in detail.

(i) In the previously-noted setting of the accel-opening responsive torque TA, since the controlled differential limiting torque is set to a low level owing to less depression of the accelerator pedal at the beginning of vehicle turning operation at a high speed, understeer is thus prevented.

(ii) The accel-controllability is enhanced because the controlled differential limiting torque is increasingly adjusted with a high output response with respect to the accel opening Acc through the accel-opening responsive torque control gain Ka correlated to input information of the vehicle turning operation.

(iii) The acceleration performance is enhanced since an optimal maximum permissible traction is obtained owing to suppression effect of acceleration slip, resulting from the adjustment of the differential limiting torque which is responsible to the accel opening Acc.

(iv) The traction performance at the drive wheels is enhanced during low- and medium-speed cornering with high lateral acceleration exerted on the vehicle body, since the accel-opening responsive torque TA (consequently the controlled differential limiting torque) and its variation rate can be set to a relatively high level in the low- and medium-speed ranges as compared with at the high-speed range. As previously noted, this results from a comparatively high vehicle-speed dependent control gain Ka' and a relatively high vehicle-speed dependent upper limit Kamax of the control gain Ka in the low and medium speed ranges. In the same reasons as explained above, the cornering stability is also enhanced during high-speed cornering with high lateral acceleration, since the controlled differential limiting torque and its variation rate can be set to a relatively low level in the high-speed range as compared with low- and medium-speed ranges.

In setting the lateral-acceleration responsive torque TYG, the torque TYG is set to zero until the lateral-acceleration YG has reached to the predetermined offset value Y0 of the lateral acceleration, as shown in FIG. 5. Above the offset value Y0, the torque TYG is designed to increase at a positive gradient defined by the proportional gain KYG in direct proportion to an increase in the lateral acceleration YG. The aim in providing the lateral-acceleration responsive torque TYG as one of essential factors of the controlled differential limiting torque is explained below.

(i) The responsiveness of the accel-control is further enhanced on turns in the presence of depression of the accelerator pedal, the lateral-acceleration responsive torque TYG is applied to the LSD in addition to the accel-opening responsive torque TA. The cornering controllability is thus enhanced by virtue of the improvement of the accel-response with respect to the differential limiting operation, since the differential limiting operation is remarkably promoted by adding the lateral-acceleration responsive torque TYG to the accel-opening responsive torque TA.

(ii) The tucked-in amount of the vehicle body is suitably adjusted during deceleration in the presence of braking action on turns, since the controlled differential limiting torque is incrementally adjusted in accordance with an increase in the lateral acceleration YG. That is, during braking on turns, the vehicle behaviour can be compensated towards understeer by virtue of a proper differential limiting operation which can be achieved by a suitably increased differential limiting torque based on the increase in the lateral acceleration.

Figure 6:
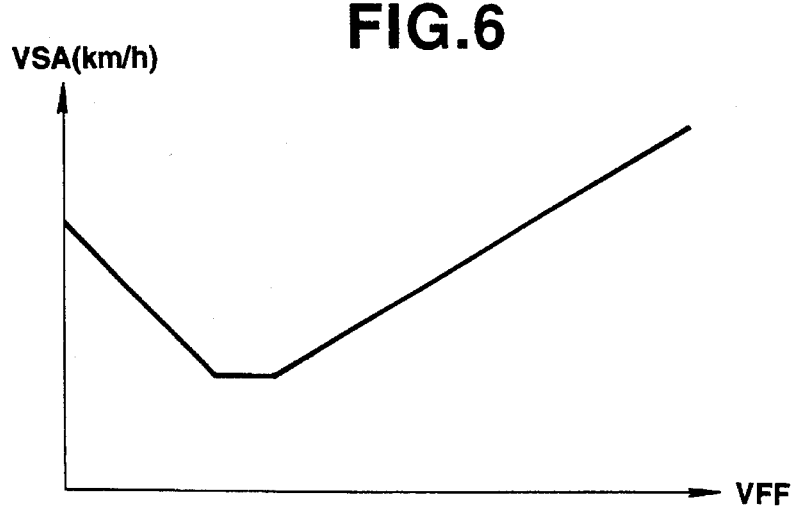
FIG. 6 is a graph illustrating a vehicle speed VFF versus reference target slip speed VS A
Figure 7:
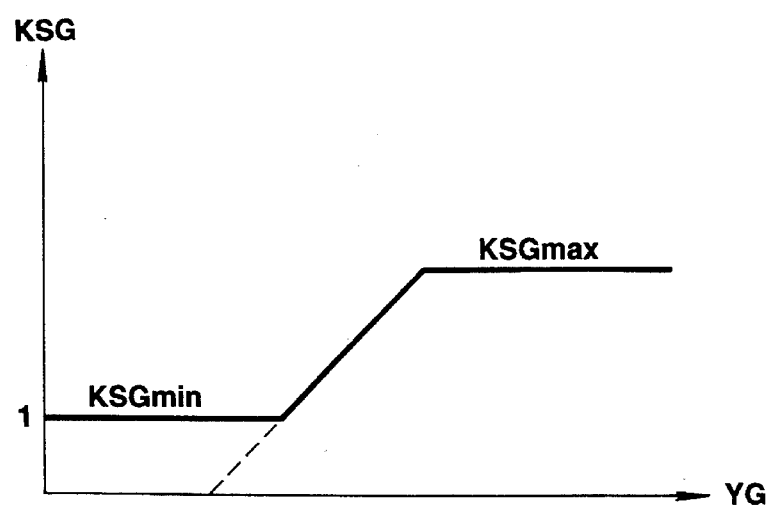
FIG. 7 is a graph illustrating a lateral acceleration YG versus proportional gain KSG of the target slip speed VS of the outer drive-wheel.

In setting the outer-wheel target slip speed VS, the target slip speed VS is determined by the product (VSA×KSG) of the vehicle-speed dependent reference target slip speed VSA having the specified V-shaped characteristic illustrated in FIG. 6 according to which the slip speed VSA is decreased in the low-speed range, and held at a minimum level in the medium-speed range, and increased in the high-speed range, and the lateral-acceleration dependent proportional gain KS G having the specified gain characteristic illustrated in FIG. 7 according to which the gain KSG is set to the minimum gain KSGmin in the low lateral-acceleration region, and to the maximum gain KSGmax in the high lateral-acceleration region, and to be increased in direct proportion to an increase in the lateral acceleration YG in the middle region midway between the low and high lateral-acceleration regions. The target slip speed VS is very important because the filtering process executed in step 41 shown in FIG. 2 is achieved based on the comparison results of the actual slip speed VRS therewith. The aim in providing the outer-wheel target slip speed VS for determination of the controlled differential limiting torque is hereinafter explained.

(i) The stability of the vehicle behaviour is ensured when the vehicle is being operated in a cornering warning region that is close to a critical state in which the vehicle will experience oversteer, because the outer-wheel target slip speed VS serving as a criterion of the cornering outer-wheel speed VOUT is determined depending on the vehicle-speed VFF and in addition the acceleration-responsive controlled differential limiting torque TAY is derived through the proper filtering process with respect to the acceleration-responsive target torque TAD in response to the slip speed difference $\Delta$VS.

(ii) The enhancement of acceleration performance is satisfactorily considered in the low-speed region, since the outer-wheel target slip speed VS, namely the allowable slip limit at the cornering outer wheel is set at a higher level in the low-speed region as compared with the medium-speed region, as appreciated from the left-hand side descending line shown in FIG. 6. In other words, the acceleration-responsive target torque TAD tends to be insensitive to the filtering process owing to the high-level target slip speed VS, i.e., the relatively high allowable slip limit in the low-speed region, and thus the slip speed difference $\Delta$VS can be maintained at a relatively great value, for instance 5 Km/h or more.

(iii) The adequate traction can be obtained on vehicle turns with a high lateral acceleration on dry pavements, since the proportional gain KSG increases in accordance with an increase in the lateral acceleration YG as illustrated in FIG. 7, and as a result the outer-wheel target slip speed VS, namely the allowable slip limit is set at a relatively high level. In this case, the slip speed difference, i.e., the outer-wheel slippage due to acceleration tends to be maintained within the allowable slip limit.

Referring now to FIG. 8, the filter employed in the active LSD controller 13 performs a filtering process in accordance with the control table shown in FIG. 8. The filtering process to the acceleration-responsive target torque TAD, i.e., (TA+TYG) is different depending on various different states defined by the relationship between the slip speed difference $\Delta$VS and the comparison results between the derived acceleration-responsive target torque TAD and the previous initial controlled torque Ti(n−1) derived through the triggered interrupt routine shown in FIG. 2 one cycle before, namely 10 msec before. As appreciated from the control table shown in FIG. 8, in case that the outer-wheel slippage (acceleration-slip amount) occurring due to acceleration is less than or equal to the allowable slip limit, that is, the actual outer-wheel slip speed VRS is less than or equal to the outer-wheel target slip speed VS, the state below the allowable slip limit are divided into three different states with respect to the slip speed difference $\Delta$VS, namely a first slip speed difference area defined by an inequality of $\Delta$VS>5 Km/h, a second slip speed difference area defined by an inequality of 3 Km/h<$\Delta$VS$\leq$5 Km/h, and a third slip speed difference area defined by an inequality of 0$\leq$$\Delta$VS$\leq$3 Km/h. On the other hand, in case that the outer-wheel slippage exceeds the allowable slip limit, i.e., VRS> VS, the state above the allowable slip limit are divided into two different states of the slip speed difference $\Delta$VS, namely a fourth slip speed difference area defined by an inequality of −3 Km/h$\leq$ $\Delta$VS<0 and a fifth slip speed difference area defined by an inequality of $\Delta$Vs<−3 Km/h. Furthermore, each of the five states of the slip speed difference are further partitioned into three different areas based on the comparison results between the instantaneously derived acceleration-responsive target torque TAD and the previous initial controlled torque Ti(n−1). The previously-noted three different areas respectively correspond to a first area defined by an inequality of Ti(n−1)<TAD, a second area defined by an equality of Ti(n−1)=TAD, and a third area defined by an inequality of Ti(n−1)>TAD. In this manner, the fifteen areas are defined by the control table. The first slip speed difference area defined by $\Delta VS>5$ Km/h means that the outer-wheel slippage is sufficiently small as compared with the allowable slip limit correlated to the outer-wheel target slip speed VS. The second slip speed difference area defined by 3 Km/h<$\Delta VS \leq 5$ Km/h means that the outer-wheel slippage is slightly small as compared with the allowable slip limit. The third slip speed difference area defined by $0 \leq \Delta VS \leq 3$ Km/h means that the outer-wheel slippage is equivalent to the allowable slip limit. The fourth slip speed difference area defined by $-3$ Km/h$\leq \Delta VS < 0$ means that the outer-wheel slippage slightly exceeds the allowable slip limit. The fifth slip speed difference area defined by $\Delta VS < -3$ Km/h means that the outer-wheel slippage greatly exceeds the allowable slip limit. The first area defined by Ti(n−1)<TAD means that a torque-increase operation for the controlled differential limiting torque is required depending on various conditions, for instance an increase in the lateral acceleration and/or an increase in the accel-opening. The second area defined by Ti(n−1)=TAD means that a torque-hold operation for the controlled differential limiting torque is required. The third area defined by Ti(n−1)>TAD means that a torque-reduction operation for the controlled differential limiting torque is required depending on various conditions, for instance a decrease in the lateral acceleration and/or a decrease in the accel-opening.

(A) In the event that the outer-wheel slippage is below the allowable slip limit, namely $0 \leq \Delta VS$ and the torque-increase operation is required:
  (i) In case of the first slip speed difference area $\Delta VS>5$ Km/h, the acceleration-responsive controlled torque TAY is updated by the acceleration-responsive target torque TAD, namely (TA+TYG) with the result that the controlled differential limiting torque is increased on the basis of the target torque value TAD.
  (ii) In case of the second slip speed difference area 3 Km/h< $\Delta VS \leq 5$ Km/h, the acceleration-responsive controlled torque TAY is updated by selecting the lower one min(TA+TYG, Ti(n−1)+0.05 kgm) of the target torque TAD and the sum {Ti(n−1)+0.05 kgm} of the previous initial controlled torque Ti(n−1) and a predetermined increment of 0.05 kgm through the select-LOW process just after a predetermined delay time equal to one cycle (10 msec) of the time-triggered interrupt routine, with the result that the increment of the updated acceleration-responsive controlled torque TAY is properly limited to be less than 0.05 kgm. Thus, the acceleration-responsive controlled torque TAY is updated by the limited torque value in the torque-increase direction after the previous initial controlled torque is held for the predetermined delay time of 10 msec. Resultingly, the controlled differential limiting torque is gradually increased because of a relatively small increment (+0.05 kgm or less) of the acceleration-responsive controlled torque TAY and the predetermined delay time of 10 msec.
  (iii) In case of the third slip speed difference area $0 \leq \Delta VS \leq 3$ Km/h, the acceleration-responsive controlled torque TAY is held at the previous initial controlled torque Ti(n−1).

(B) In the event that the outer-wheel slippage is below the allowable slip limit, namely $0 \leq \Delta VS$ and the torque-hold operation is required:
  (i) In case of the first slip speed difference area $\Delta VS>5$ Km/h, the acceleration-responsive controlled torque TAY is updated by the acceleration-responsive target torque TAD without any limitation, with the result that the controlled differential limiting torque is held constant.
  (ii) In case of the second and third slip speed difference areas $0 > \Delta VS \leq 5$ Km/h, the acceleration-responsive controlled torque TAY is held at the previous initial controlled torque Ti(n−1), with the result that the controlled differential limiting torque is held constant.

(C) In the event that the outer-wheel slippage is below the allowable slip limit, namely $0 < \Delta VS$ and the torque-reduction operation is required:
  (i) Irrespective of the slip speed difference $\Delta VS$, the acceleration-responsive controlled torque TAY is updated by the acceleration-responsive target torque TAD, with the result that the controlled differential limiting torque is decreased.

(D) In the event that the outer-wheel slippage is above the allowable slip limit, namely $\Delta VS < 0$ and either one of the torque-increase operation and the torque-hold operation is required:
  (i) In case of the fourth slip speed difference area $-3$ Km/h$\leq \Delta VS < 0$, the acceleration-responsive controlled torque TAY is updated by the difference {Ti(n−1)−0.05 kgm} of the previous initial controlled torque Ti(n−1) and a predetermined torque value 0.05 kgm just after the predetermined delay time (10 msec). In the difference {Ti(n−1)−0.05 kgm}, the negative torque value −0.05 kgm corresponds to a decrement of the previous initial controlled torque Ti(n−1). Thus, the decrement of the updated acceleration-responsive controlled torque TAY can be properly limited by the predetermined negative torque value 0.05 kgm. This means that the acceleration-responsive controlled torque TAY is updated by the limited torque value in the torque-decrease direction after the previous initial controlled torque is held for the predetermined delay time of 10 msec. Accordingly, the controlled differential limiting torque is gradually decreased owing to a relatively small torque decrement (−0.05 kgm) and the predetermined delay time of 10 msec.
  (ii) In case of the fifth slip speed difference area $\Delta VS < -3$ Km/h, the acceleration-responsive controlled torque TAY is updated by the difference {Ti(n−1)−0.5 kgm} of the previous initial controlled torque Ti(n−1) and a predetermined torque value 0.5 kgm without any delay time. In the difference {Ti(n−1)−0.5 kgm}, the negative torque value −0.5 kgm corresponds to a relatively large decrement of the previous initial controlled torque Ti(n−1). Thus, the decrement of the updated acceleration-responsive controlled torque TAY can be properly limited by the predetermined negative torque value −0.5 kgm. This means that the acceleration-responsive controlled torque TAY is updated by the limited torque value in the torque-decrease direction without any delay time. Accordingly, the controlled differential limiting torque is quickly decreased, as its decrement is properly limited by a relatively large torque decrement (−0.5 kgm).

(E) In the event that the outer-wheel slippage is above the allowable slip limit, namely $\Delta VS < 0$ and the torque-reduction operation is required:

(i) In case of the fourth slip speed difference area $-3$ Km/h$\leq \Delta$VS$<0$, the acceleration-responsive controlled torque TAY is updated by selecting the lower one (TA+TYG, Ti(n−1)−0.05 kgm) of the target torque TAD and the difference {Ti(n−1)−0.05 kgm} of the previous initial controlled torque Ti(n−1) and a predetermined torque value 0.05 kgm through the select-LOW process just after the predetermined delay time (10 msec), with the result that the decrement of the updated acceleration-responsive controlled torque TAY can be properly limited in the vicinity of the predetermined negative torque value −0.05 kgm. Thus, the acceleration-responsive controlled torque TAY is updated by the limited torque value in the torque-decrease direction after the previous initial controlled torque is held for the predetermined delay time. Resultingly, the controlled differential limiting torque is gradually decreased due to a relatively small decrement (approximately −0.05 kgm) of the acceleration-responsive controlled torque TAY and the predetermined delay time of 10 msec.

(ii) In case of the fifth slip speed difference area $\Delta$VS$<-3$ Km/h, the acceleration-responsive controlled torque TAY is updated by selecting the lower one (TA+TYG, Ti(n−1)−0.5 kgm) of the target torque TAD and the difference {Ti(n−1)−0.5 kgm} of the previous initial controlled torque Ti(n−1) and a predetermined torque value 0.5 kgm through the select-LOW process, with the result that the decrement of the updated acceleration-responsive controlled torque TAY can be properly limited in the vicinity of the predetermined negative torque value −0.5 kgm. Thus, the acceleration-responsive controlled torque TAY is quickly updated by the limited torque value in the torque-decrease direction without any delay time. Accordingly, the controlled differential limiting torque is quickly decreased, as its decrement is properly limited by a relatively large torque decrement (approximately −0.5 kgm). In actual, the respective select-LOW process is achieved by the select-LOW comparator of the active LSD controller 13.

With the previously-noted arrangement, the system operates as follows.

When the vehicle is not conditioned in a cornering critical region on turns in the presence of accel-depression, i.e., in case of $\Delta$VS$>5$ Km/h, the acceleration-responsive controlled torque TAY is quickly updated by the acceleration-responsive target torque TAD (TA+TYG) without any torque limitation and any time delay, and thus the differential limiting torque control is executed based on the quickly updated controlled torque TAY essentially equivalent to the target torque TAD. In this manner, since the differential limiting torque control is quickly executed with a high-response to the accelerating operation in consideration with both factors, namely the accel-opening responsive torque TA and the lateral-acceleration responsive torque TYG, a high acceleration performance is obtained depending on the accel-opening Acc during the vehicle turn in the presence of accel-depression.

When the vehicle is operating in a cornering critical region on turns in the presence of accel-depression, i.e., in case of $\Delta$VS$\leq 5$ Km/h, the acceleration-responsive target torque TAD is properly filtered through the previously-noted filtering process and the acceleration-responsive controlled torque TAY is updated by the filtered torque, so that the cornering outer-wheel slippage (acceleration-slip amount) occurring due to acceleration is maintained within the allowable slip limit, i.e., the cornering outer-wheel slip speed is maintained within the derived outer-wheel target slip speed VS. As appreciated, on-turns in the presence of accel-depression, a cornering force at the cornering outer-wheel is not rapidly dropped but retained at a high level, thereby preventing rapid change in the vehicle behaviour owing to accelerating operation, called power oversteer.

As will be appreciated from the above, in the differential limiting torque control system which electronically controls the differential limiting torque to be applied between the right and left drive wheels, the acceleration-responsive controlled torque TAY is set via a predetermined filtering process according to which the acceleration-responsive target torque TAD is filtered to suitably suppress the increment and decrement of the updated acceleration-responsive controlled torque depending on the slip speed difference $\Delta$VS and the magnitude relationship between the acceleration-responsive target torque TAD and the previous initial controlled torque Ti(n−1). With the filtered torque, the actual slip speed VRS at the outer wheel is constantly adjusted to be below the derived target slip speed VS in order to maintain a cornering force at the outer wheel at a high level on turns in the presence of accel-depression. Therefore, a rapid change in the vehicle behaviour is effectively prevented in the cornering critical region, while ensuring the highest possible acceleration performance depending on the accelerating operation on turns. As seen in FIG. 6, since the target slip speed VS, namely the allowable slip limit is set at a higher level in the low vehicle-speed region as compared with the medium-speed region, the acceleration-responsive target torque TAD is not easily limited through the filtering process, whereby the acceleration performance can be enhanced in the low-speed region. As seen in FIG. 7, the vehicle speed VFF versus proportional gain KSG characteristic is so designed that the allowable slip limit is set to a higher level owing to the proportional gain KSG being set at a relatively large value when detecting a great lateral acceleration exerted on the vehicle. The adequate traction can be ensured on vehicle turns with a high lateral acceleration on dry pavements.

Although the hydraulically-operated multiple-disc type clutch is used as a differential limiting clutch, the hydraulically-operated clutch may be replaced with various types of clutches, for instance an electromagnetic clutch which can variably adjust a differential limiting torque in response to a control signal from an active LSD controller.

In the embodiment, although an outer-wheel slip speed is used as a physical quantity correlative to an actual slippage at the cornering outer wheel, a slip rate may be used as the operative parameter correlative to the outer-wheel slippage. Furthermore, although the accel-opening responsive torque TA is dependent on both the accel opening Acc and the lateral acceleration YG, the accel-opening responsive torque TA may be dependent only on the accel opening Acc. Alternatively, the accel-opening responsive torque TA may be dependent on various control parameter indicative of an accelerating degree of the vehicle, such as a longitudinal acceleration XG and/or a rate of change in the accel opening Acc in addition to the accel opening Acc and the lateral acceleration YG.

In the preferred embodiment, although the acceleration-responsive target torque TAD is derived by calculating the sum of the accel-opening responsive torque TA and the lateral-acceleration responsive torque TYG, the acceleration-responsive target torque TAD may be dependent only on the accel-opening responsive torque TA.

Although the differential limiting torque control system of the embodiment is exemplified in case of the rear-wheel drive vehicles, the system may be applied for automotive vehicles having at least one pair of drive road wheels, for instance four-wheel drive vehicles.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A differential limiting torque control system for an automotive vehicle having at least one pair of right and left drive road wheels, comprising:

differential limiting means mounted between the right and left drive road wheels, and responsive to a control command for producing a differential limiting torque through which a differential action is limited;

sensor means for detecting a vehicle speed and an accelerating degree of the vehicle;

target torque derivation means responsive to said accelerating degree, for deriving an acceleration-responsive target torque value for said differential limiting torque;

allowable slip limit derivation means for deriving an allowable slip limit of an outer wheel of said right and left drive road wheels on the basis of said vehicle speed, during cornering of the vehicle;

actual slip amount derivation means for deriving an actual slip amount at said outer wheel;

filtering means responsive to a slip difference between said actual slip amount and said allowable slip limit, for filtering said acceleration-responsive target torque value, so that said actual slip amount is maintained within said allowable slip limit by setting a limit to a decrement of a previous value of said control command through a filtering process when said actual slip amount exceeds said allowable slip limit; and control means for generating said control command to said differential limiting means to adjust said differential limiting torque to the filtered target torque value.

2. The differential limiting torque control system according to claim 1, which further comprises an additional sensor means for detecting a lateral acceleration exerted on the vehicle, and said target toque derivation means being responsive to said lateral acceleration as well as said accelerating degree, for deriving said acceleration-responsive target torque value based on both the detected lateral acceleration and the detected accelerating degree.

3. The differential limiting torque control system according to claim 1, wherein said decrement is varied depending on the slip difference so that a magnitude of said decrement is increasingly compensated as the actual slip amount is increased greater than the allowable slip limit.

4. The differential limiting torque control system according to claim 3, wherein the previous value of said control command is updated with said decrement just after a predetermined delay time has elapsed, when said actual slip amount is within a predetermined slip region close to an allowable slip limit region.

5. A differential limiting torque control system for an automotive vehicle having at least one pair of right and left drive road wheels, comprising:

differential limiting means mounted between the right and left drive road wheels, and responsive to a control command for producing a controlled differential limiting torque through which a differential action is limited;

sensor means for detecting a vehicle speed and an accelerating degree of the vehicle;

target torque derivation means responsive to said accelerating degree, for deriving an acceleration-responsive target torque value for said differential limiting torque;

allowable slip limit derivation means for deriving an allowable slip limit of an outer wheel of said right and left drive road wheels on the basis of said vehicle speed, during cornering of the vehicle;

actual slip amount derivation means for deriving an actual slip amount at said outer wheel;

filtering means responsive to a slip difference between said actual slip amount and said allowable slip limit, for filtering said acceleration-responsive target torque value, so that said actual slip amount is maintained within said allowable slip limit by setting a limit to an increment of a previous value of said control command through a filtering process when said actual slip amount is less than said allowable slip limit and the derived acceleration-responsive target torque value exceeds the previous value of said control command; and control means for generating said control command to said differential limiting means to adjust said differential limiting torque to the filtered target torque value.

6. The differential limiting torque control system according to claim 5, wherein the previous value of said control command is updated with said increment just after a predetermined delay time has elapsed, when said actual slip amount is within a predetermined slip region close to an allowable slip limit region.

7. The differential limiting torque control system according to claim 6, wherein said filtering process includes a select-low process which selects a lower one of the derived acceleration-responsive target torque value and the sum of the previous value of said control command and said increment.

8. A differential limiting torque control system for an automotive vehicle having at least one pair of right and left drive road wheels, comprising:

differential limiting means mounted between the right and left drive road wheels, and responsive to a control command for producing a differential limiting torque through which a differential action is limited;

sensor means for detecting a vehicle speed, an accelerating degree of the vehicle, and a lateral acceleration exerted on the vehicle;

target torque derivation means responsive to said accelerating degree and said lateral acceleration, for deriving an acceleration-responsive target torque value for said differential limiting torque;

target slip speed derivation means for deriving a target slip speed at an outer wheel of said right and left drive road wheels on the basis of said vehicle speed and said lateral acceleration, during cornering of the vehicle;

actual slip speed derivation means for deriving an actual slip speed at said outer wheel;

comparing means for comparing a previous value of said control command with the derived acceleration-responsive target torque value to obtain a comparison result;

filtering means responsive to a slip speed difference between said actual slip speed and said target slip speed and said comparison result, for filtering said acceleration-responsive target torque value so that said actual slip speed is maintained within said target slip speed, a filtering process of said filtering means being executed by setting a limit to a decrement of a previous value of said control command when said actual slip speed exceeds said target slip speed, and by setting a limit to an increment of the previous value of said control command when said actual slip speed is less than said target slip speed and within a predetermined slip speed region close to said target slip speed and the derived acceleration-responsive target torque value exceeds the previous value of said control command; and control means for generating said control command to said differential limiting means to adjust said differential limiting torque to the filtered target torque value.

9. The differential limiting torque control system according to claim 8, wherein said decrement is varied depending on the slip speed difference so that a magnitude of said decrement is increasingly compensated as the actual slip speed is increased greater than said target slip speed.

10. The differential limiting torque control system according to claim 8, wherein the previous value of said control command is updated with said increment just after a predetermined delay time has elapsed.

11. The differential limiting torque control system according to claim 10, wherein said filtering process includes a select-low process which selects a lower one of the derived acceleration-responsive target torque value and the sum of the previous value of said control command and said increment.

* * * * *